United States Patent
Guo et al.

(10) Patent No.: US 12,259,839 B2
(45) Date of Patent: Mar. 25, 2025

(54) MULTI-CHIP INTERCONNECTION SYSTEM BASED ON PCIE BUSES

(71) Applicant: ZTE Corporation, Shenzhen (CN)

(72) Inventors: Shufan Guo, Shenzhen (CN); Yonghang Wu, Shenzhen (CN); Kunyan Cai, Shenzhen (CN); Shifeng Li, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 17/771,549

(22) PCT Filed: Oct. 20, 2020

(86) PCT No.: PCT/CN2020/122248
§ 371 (c)(1),
(2) Date: Apr. 25, 2022

(87) PCT Pub. No.: WO2021/082990
PCT Pub. Date: May 6, 2021

(65) Prior Publication Data
US 2022/0365898 A1  Nov. 17, 2022

(30) Foreign Application Priority Data
Oct. 31, 2019 (CN) .......................... 201911056191.2

(51) Int. Cl.
*G06F 13/36* (2006.01)
*G06F 13/42* (2006.01)

(52) U.S. Cl.
CPC .. *G06F 13/4221* (2013.01); *G06F 2213/0026* (2013.01)

(58) Field of Classification Search
CPC ......... G06F 13/4221; G06F 2213/0026; G06F 15/167; G06F 13/382; G06F 15/17306; G06F 15/7864
See application file for complete search history.

(56) References Cited

U.S. PATENT DOCUMENTS 8,996,644 B2 * 3/2015 Pope .................... G06Q 40/04
709/212
2012/0254587 A1  10/2012 Biran
(Continued)

FOREIGN PATENT DOCUMENTS

CN  107690622 A  2/2018
CN  109240980 A  1/2019
(Continued)

OTHER PUBLICATIONS

European Search Report for corresponding application EP20880510; Report dated Dec. 6, 2022.
(Continued)

*Primary Examiner* — Henry Tsai
*Assistant Examiner* — Kim T Huynh
(74) *Attorney, Agent, or Firm* — CANTOR COLBURN LLP

(57) ABSTRACT

Provided is a multi-chip interconnection system based on Peripheral Component Interconnect Express (PCIE) buses. The system includes: N accelerators, M processors, and M PCIE buses, N and M being positive integers, and M being greater than N. Each accelerator includes at least two endpoints. Each processor includes one root complex. One endpoint and one root complex are connected by means of one PCIE bus, so that the at least two endpoints of each accelerator are connected to at least two processors by means of different PCIE buses.

17 Claims, 5 Drawing Sheets

(56) References Cited

U.S. PATENT DOCUMENTS

| | | | |
|---|---|---|---|
| 2018/0024955 A1 | 1/2018 | Blevins | |
| 2018/0101494 A1* | 4/2018 | Davis | G06F 13/105 |
| 2018/0322299 A1* | 11/2018 | Iyer | G06F 21/85 |
| 2019/0065401 A1* | 2/2019 | Dormitzer | H05K 7/1489 |
| 2019/0205278 A1 | 7/2019 | Panian | |
| 2020/0201806 A1* | 6/2020 | Iyer | G06F 13/4221 |
| 2022/0365898 A1* | 11/2022 | Guo | G06F 15/167 |

FOREIGN PATENT DOCUMENTS

| | | | |
|---|---|---|---|
| CN | 109739785 A | 5/2019 | |
| CN | 110297802 A | 10/2019 | |

OTHER PUBLICATIONS

International Search Report for corresponding application PCT/CN2020/122248 filed Oct. 20, 2020; Mail date Jan. 18, 2021.

* cited by examiner

MULTI-CHIP INTERCONNECTION SYSTEM BASED ON PCIE BUSES

CROSS REFERENCE

This application is a National Stage Filing of the PCT International Application No. PCT/CN2020/122248 filed on Oct. 20, 2020, which claims priority to Chinese Application No. 201911056191.2 filed on Oct. 31, 2019, the entirety of which is herein incorporated by reference.

TECHNICAL FIELD

The present disclosure relates to the field of hardware system solutions, and in particular to a multi-chip interconnection system based on Peripheral Component Interconnect Express (PCIE) buses.

BACKGROUND

With the rapid improvement of hardware performance and increasingly refined computing scenarios, artificial intelligence, autonomous driving and $5^{th}$ Generation (5G) communication have different demands on hardware. For example, some computing scenarios focus on the performance of Neural network Processing Unit (NPU), some other computing scenarios put emphasis on the stability of sensors and the correctness of decision making systems, still other computing scenarios pay attention to transmission bandwidths and delays.

Conventional computing chips are all solidified computing devices, which cannot be flexibly matched and cut. Although the Field Programmable Gate Array (FPGA) can realize hardware programming, the price of FPGA is too high for most equipment manufacturers.

PCIE is a high-speed serial computer expansion bus standard developed by Intel, and PCIE of version 4.0 can reach a rate of 16 GT/s, meeting most requirements for high-speed data transmission. A processor is interconnected with high-speed peripherals through a tree PCIE bus structure to achieve the purpose of high-speed data transmission. FIG. 1 is a schematic diagram of a tree PCIE bus between processors and accelerators in the related art.

In the conventional scheme where multiple processors collaboratively use accelerators to produce data, various processor subsystems are interconnected with respective accelerators through the PCIE, and data is transmitted between the processor subsystems through Ethernet. The scheme relies on high-speed network devices and has the disadvantages of high hardware cost and large data delay.

For the above problem, no effective solution has been proposed yet.

SUMMARY

Embodiments of the present disclosure provide a multi-chip interconnection system based on PCIE buses and a method for data collaboration processing, which can at least solve the problem in the related art that data collaboration between multiple processors and accelerators cannot be realized efficiently.

According to some embodiments of the present disclosure, a multi-chip interconnection system based on PCIE buses is provided, which includes: N accelerators, M processors, and M PCIE buses, N and M being positive integers, and M being greater than N. Each accelerator includes at least two endpoints (EP). Each processor includes one root complex (RC). One endpoint and one root complex are connected by means of one PCIE bus, so that the at least two endpoints of each accelerator are connected to at least two processors by means of different PCIE buses.

According to some other embodiments of the present disclosure, a method for data collaboration processing is provided, which includes the following operations. A first processor initiates a read and/or write access request to an accelerator, wherein a root complex of the first processor is connected to an endpoint of the accelerator by means of a first PCIE bus; the accelerator includes at least two endpoints, and is connected to at least two processors through the at least two endpoints; and the at least two processors include the first processor. The root complex of the first processor converts the read and/or write access request into an access address of a domain of the first PCIE bus, and then sends the access address of the domain of the first PCIE bus to the accelerator, so that the first processor accesses data of the accelerator.

According to some other embodiments of the present disclosure, a method for data collaboration processing is provided, which includes the following operations. An accelerator establishes a connection with M processors, wherein the accelerator includes at least M endpoints, and each processor includes one root complex; one endpoint and one root complex are connected by means of the PCIE bus; M is a positive integer greater than 1 so that the M endpoints of the accelerator are connected to at least M processors by means of different PCIE buses; and the M processors include the first processor. The accelerator receives an access address of a domain of a first PCIE bus, wherein the access address of the domain of the first PCIE bus is converted, by the first processor, from a read and/or write access request initiated by the first processor, so that the accelerator accesses data of the first processor.

According to some other embodiments of the present disclosure, a storage medium is also provided, in which a computer program is stored. The computer program is configured to execute, when running, the operations in any above embodiment of the method for data collaboration processing.

According to some other embodiments of the present disclosure, an electronic device is also provided, which includes a memory and a processor. The memory stores a computer program. The processor is configured to run the computer program to execute the operations in any above embodiment of the method for data collaboration processing.

Through the embodiments of the present disclosure, a multi-chip interconnection system based on PCIE buses includes N accelerators, M processors, and M PCIE buses, N and M being positive integers, and M being greater than N. Each accelerator includes at least two endpoints. Each processor includes one root complex. One endpoint and one root complex are connected by means of one PCIE bus, so that the at least two endpoints of each accelerator are connected to at least two processors by means of different PCIE buses.

BRIEF DESCRIPTION OF THE DRAWINGS

The accompanying drawings described here are used for providing further understanding of the present disclosure, and constitute a part of the present disclosure. Schematic embodiments of the present disclosure and description thereof are used for illustrating the present disclosure and not intended to form an improper limit to the present disclosure. In the accompanying drawings.

DETAILED DESCRIPTION

The present disclosure is elaborated below with reference to the accompanying drawings and embodiments. It is to be noted that the embodiments in the present application and characteristics in the embodiments may be combined without conflicts.

It is to be noted that the terms like "first" and "second" in the specification, claims and accompanying drawings of the present disclosure are used for differentiating the similar objects, but do not have to describe a specific order or a sequence.

Figure 1:
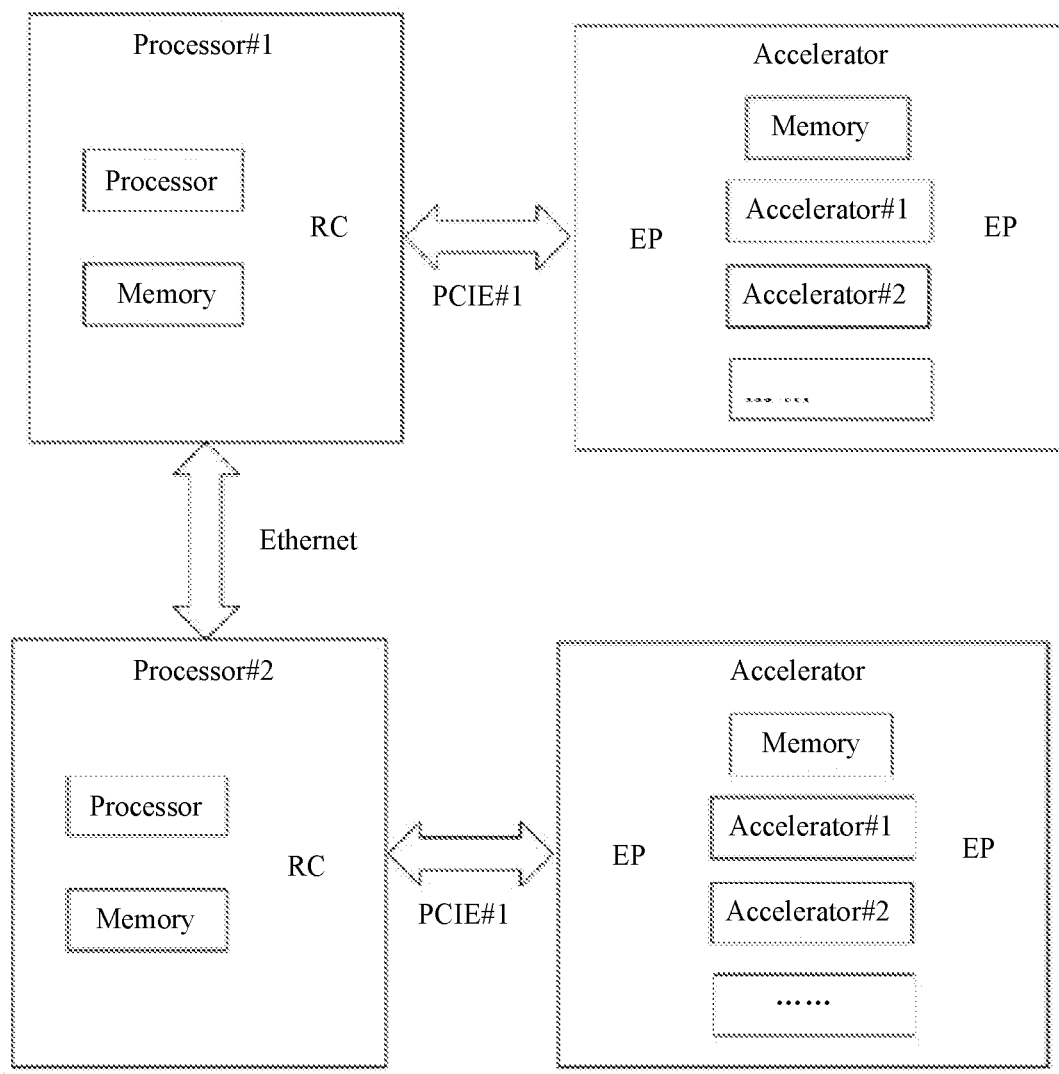
FIG. 1 is a schematic diagram of a tree PCIE bus between processors and accelerators in the related art.
Figure 2:
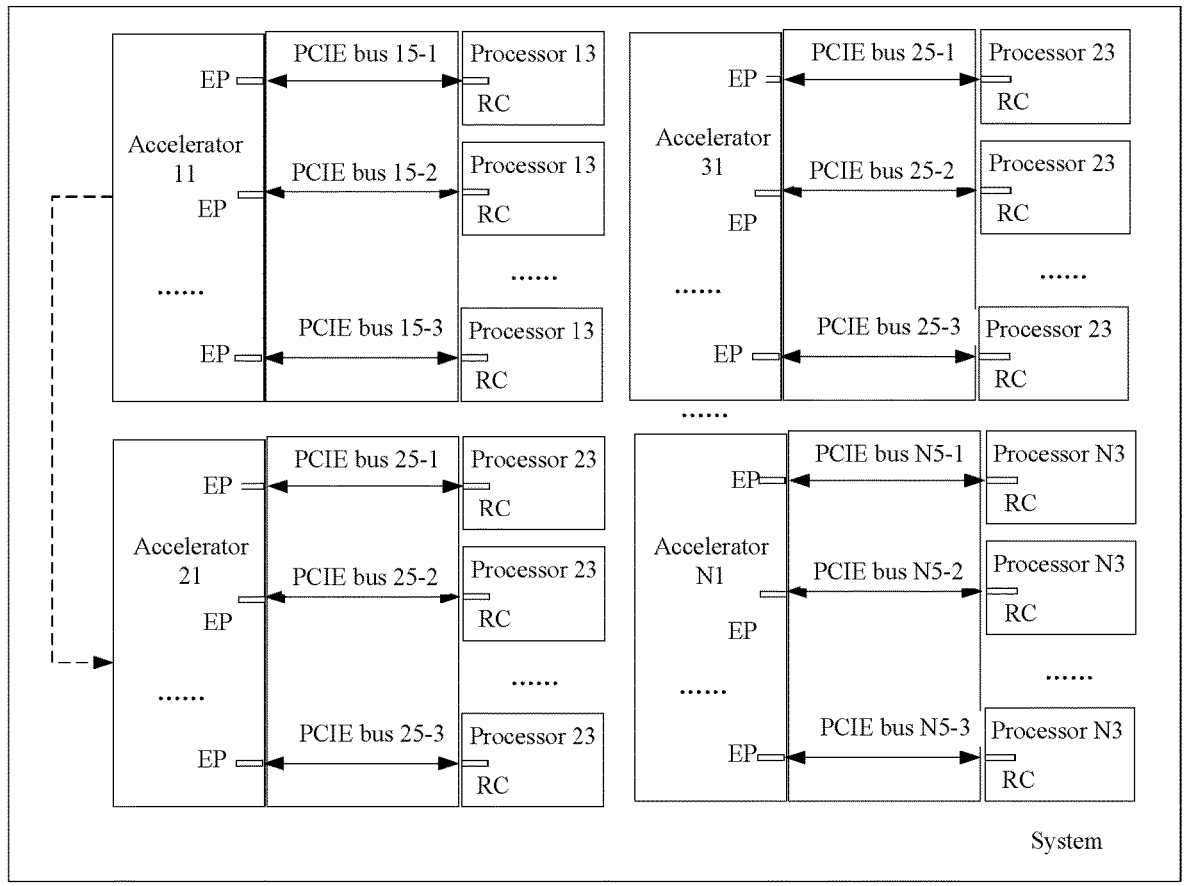
FIG. 2 is a schematic diagram of a multi-chip interconnection system based on PCIE buses according to some embodiments of the present disclosure.

According to some embodiments of the present disclosure, a multi-chip interconnection system based on PCIE buses is provided. FIG. 2 is a schematic diagram of a multi-chip interconnection system based on PCIE buses. The system includes N accelerators, M processors, and M PCIE buses, N and M being positive integers, and M being greater than N. Each of the N accelerators includes at least two endpoints. Each of the M processors includes a root complex. One endpoint and one root complex are connected by means of one PCIE bus, so that the at least two endpoints of each accelerator are connected to at least two processors by means of different PCIE buses.

Figure 3:
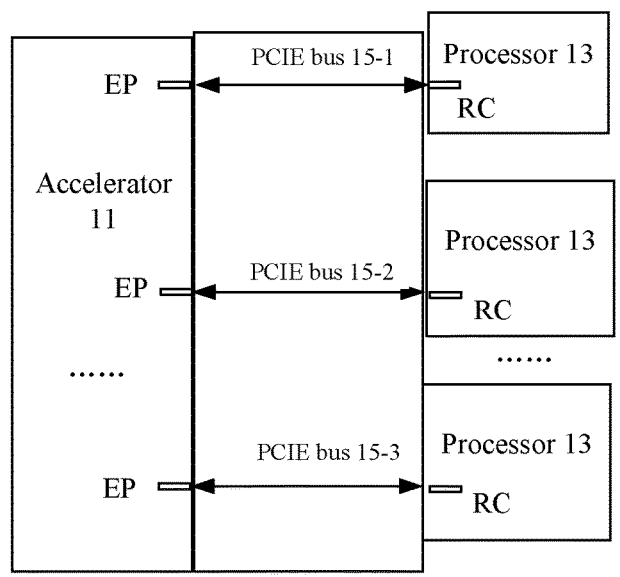
FIG. 3 is a structure diagram of connection between an accelerator and processors in the system according to some embodiments of the present disclosure.

It is to be noted that in a case where N is greater than 1, communication may be or may not be established among the N accelerators in the system. The communication may be established in any of the conventional manners, which is not specifically limited here. For example, if N is 2, there are 2 sets of the following structures in the system. Taking a structure with one accelerator and at least two processors for example, as shown in FIG. 3, communication may be or may not be established between 2 accelerators. By analogy, when N is 3, there are 3 sets of the structures as shown in FIG. 3 in the system. Communication may be established between 2 of 3 accelerators, or communication may be or may not be established among the 3 accelerators. For example, there are accelerator 1, accelerator 2 and accelerator 3 in the system, the accelerator 1 may establish communication with the accelerator 2, but does not establish communication with the accelerator 3, or the accelerator 1 may establish communication with both the accelerator 2 and the accelerator 3; or the accelerator 1 may establish communication with the accelerator 2, the accelerator 2 may establish communication with the accelerator 3, but there is no communication between the accelerator 1 and the accelerator 3.

FIG. 3 is a structure diagram of connection between an accelerator and processors in the system. The structure includes an accelerator 11, processors 13, and PCIE buses 15.

The accelerator 11 includes at least one endpoint which is configured to be connected to the processor 13.

Each processor 13 includes a root complex which is connected to the endpoint of the accelerator 11 by means of the PCIE bus 15.

It is to be noted that each of multiple processors is connected to the accelerator by means of its own PCIE bus. For example, the processor 1 is connected to the accelerator by means of the PCIE bus 1, and the processor 2 is connected to the accelerator by means of the PCIE bus 2.

Through the above system, N accelerators and M processors establish communication. The accelerator 11 includes at least two endpoints which are connected to the processors 13. Each processor 13 includes a root complex which is connected to the endpoint of the accelerator 11 by means of the PCIE bus 15. Since the system is based on an accelerator-centered connection having a plurality of processors to form a star-type PCIE computing structure, data collaboration between multiple processors and accelerators can be completed without the need for additional high-speed devices, achieving the technical effects of improving data processing efficiency and reducing the increase or decrease of devices.

It is to be noted that, if the system includes N accelerators, then each of the N accelerators is connected to at least two processors.

It is to be noted that, in the embodiments of the present disclosure, if there are multiple accelerators, the multiple accelerators may communicate by means of Ethernet, and may also be connected by means of the PCIE bus. Thus, data interaction between multiple accelerators and multiple processors can be realized, improving the operating rate of data.

As an exemplary embodiment, the system may also include: a processor, which is configured to assign an access address of a domain of the PCIE bus to the endpoint of the accelerator after the multi-chip interconnection system is powered on.

According to the embodiments of the present disclosure, some embodiments of a method for data collaboration processing are also provided. It is to be noted that these operations presented in the flowchart of the accompanying drawings can be executed in a computer system like a group of computer executable instructions, and moreover, although a logical sequence is shown in the flowchart, in some cases, the presented or described operations can be performed in a sequence different from that described here.

It is to be noted that the method for data collaboration processing is realized on the basis of the multi-chip interconnection system based on PCIE buses.

The method for data collaboration processing in the embodiments of the present disclosure is described in detail below.

Figure 4:
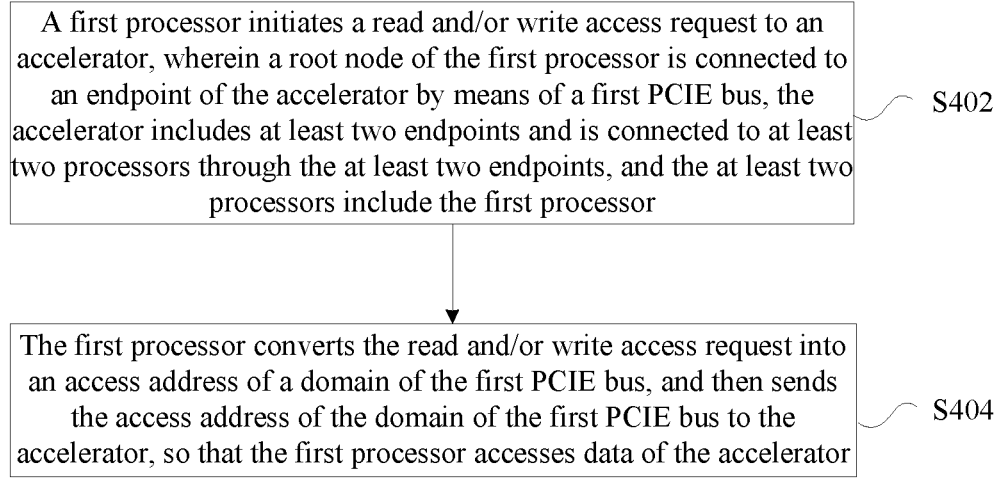
FIG. 4 is a flowchart of a method for data collaboration processing according to some embodiments of the present disclosure.

FIG. 4 is a flowchart of a method for data collaboration processing according to some embodiments of the present disclosure. As shown in FIG. 4, the method for data collaboration processing includes the following operations.

At S402, a first processor initiates a read and/or write (also referred to as read/write) access request to an accelerator. A root complex of the first processor is connected to an endpoint of the accelerator by means of a first PCIE bus, the accelerator includes at least two endpoints and is connected to at least two processors through the at least two endpoints, and the at least two processors include the first processor.

At S404, the first processor converts the read and/or write access request into the access address of the domain of the first PCIE bus, and then sends the access address of the domain of the first PCIE bus to the accelerator, so that the first processor accesses data of the accelerator.

The operation that the first processor accesses the data of the accelerator may be, but is not limited to, configuring and reading and/or writing the data in the accelerator.

Through the above operations, a first processor initiates a read and/or write access request to an accelerator, wherein a root complex of the first processor is connected to an endpoint of the accelerator by means of a first PCIE bus; the accelerator includes at least two endpoints, and is connected to at least two processors through the at least two endpoints; and the at least two processors include the first processor. The root complex of the first processor converts the read and/or write access request into an access address of a domain of the first PCIE bus, and then sends the access address of the domain of the first PCIE bus to the accelerator, so that the first processor accesses data of the accelerator. In this way, data collaboration between multiple processors and accelerators can be completed without the need for additional high-speed devices, thereby achieving the technical effects of improving data processing efficiency and reducing the increase or decrease of devices.

As an exemplary embodiment, after the first processor initiates the read and/or write access request to the accelerator, the method may further include that: the first processor converts the read and/or write access request into the access address of the domain of the first PCIE bus; and in a case where the converted access address of the domain of the first PCIE bus falls into a domain space of a second processor, the access address of the domain of the first PCIE bus is converted into an access address of the domain space of the second processor, so that the first processor accesses data of the second processor.

It is to be noted that based on the process in which the first processor accesses the data of the second processor, in the same way, the second processor may also access the data of the first processor.

As an exemplary embodiment, the operation that the first processor accesses the data of the second processor may include that: the accelerator receives first data sent by the processor, and processes the first data to obtain second data after the first data is processed; the accelerator notifies a result of processing the first data to one or more second processor (there being one or multiple second processors); the accelerator receives a second data request initiated by a respective one of the one or more second processors; and the accelerator sends, in responsive to the second data request, the second data to the respective one of the one or more second processors. Thus, the first processor and one or multiple second processors can access each other across PCIE.

As an exemplary embodiment, the operation that the accelerator sends, in responsive to the second data request, the second data to the respective one of the one or more second processors may include that: the accelerator receives, by means of the first PCIE bus, the first data sent by the first processor; the accelerator processes the first data to obtain the second data, and saves the second data; the accelerator notifies the respective one of the one or more second processors of a situation that the second data is obtained; and the accelerator sends the second data to the respective one of the one or more second processors through a second PCIE bus. Thus, the first processor and one or multiple second processors can access data of each other across the PCIE bus.

The method for data collaboration processing in the embodiments of the present disclosure is described in detail below.

Figure 5:
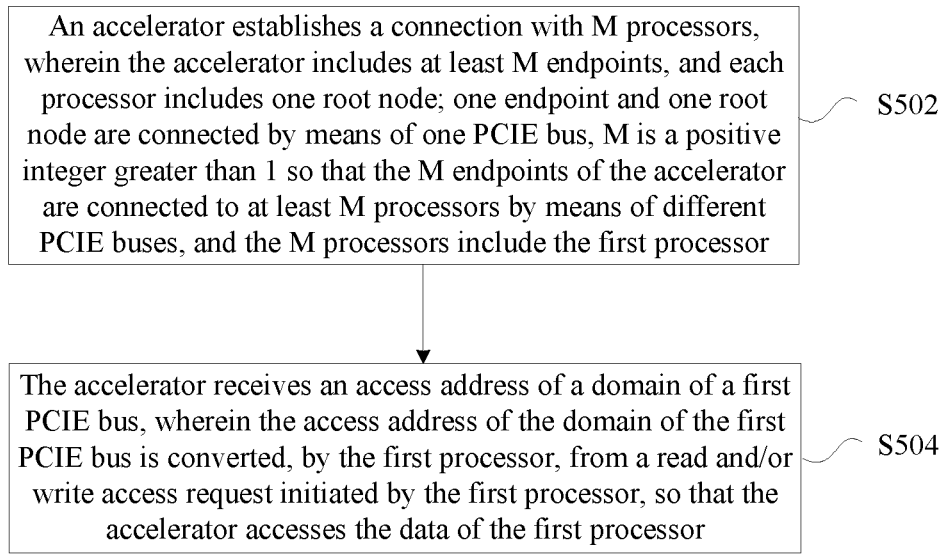
FIG. 5 is a flowchart of another method for data collaboration processing according to some embodiments of the present disclosure.

FIG. 5 is a flowchart of a method for data collaboration processing according to some embodiments of the present disclosure. As shown in FIG. 5, the method for data collaboration processing includes the following operations.

At S502, an accelerator establishes a connection with M processors. The accelerator includes at least M endpoints, and each processor includes one root complex. One endpoint and one root complex are connected by means of one PCIE bus, M is a positive integer greater than 1 so that the M endpoints of the accelerator are connected to at least M processors by means of different PCIE buses, and the M processors include the first processor.

At S504, the accelerator receives an access address of a domain of a first PCIE bus. The access address of the domain of the first PCIE bus is converted, by the first processor, from a read and/or write access request initiated by the first processor, so that the accelerator accesses the data of the first processor.

The access address of the domain of the first PCIE bus received by the accelerator is converted, by the first processor, from the read and/or write access request initiated by the first processor.

In some exemplary implementations, before the accelerator receives the read and/or write access request initiated by the first processor, the method may also include that: the accelerator sends the access address of the domain of the first PCIE bus; and the access address of the domain of the first PCIE bus is converted into the access address of the domain space of the first processor, so that the accelerator accesses the first processor.

Through the above operations, the accelerator establishes a connection with M processors, wherein the accelerator comprises at least M endpoints, and each processor comprises one root complex; one endpoint and one root complex are connected by means of one PCIE bus; M is a positive integer greater than 1 so that the M endpoints of the accelerator are connected to at least M processors by means of different PCIE buses; and the M processors comprise a first processor; and the accelerator receives an access address of a domain of a first PCIE bus, wherein the access address of the domain of the first PCIE bus is converted, by the first processor, from a read and/or write access request initiated by the first processor, thereby accessing, by the accelerator, data of the first processor. In this way, data collaboration between multiple processors and accelerators can be completed without the need for additional high-speed devices, thereby achieving the technical effects of improving data processing efficiency and reducing the increase or decrease of devices.

In combination with the above embodiments, an exemplary embodiment of the present disclosure provides a method for star-type multi-chip interconnection based on PCIE buses and a corresponding device.

The exemplary embodiment adopts the following technical solution. The system is divided into two parts, namely a processor chip and an accelerator chip.

The core of the processor chip includes, but is not limited to, X86 and ARM processor, and is required to support a PCIE function and serve as Root Complex (RC) of the PCIE bus.

The accelerator chip includes an accelerator module and associated memory unit required in various computing scenarios, and serves as End Point (EP) of the PCIE bus.

Figure 6:
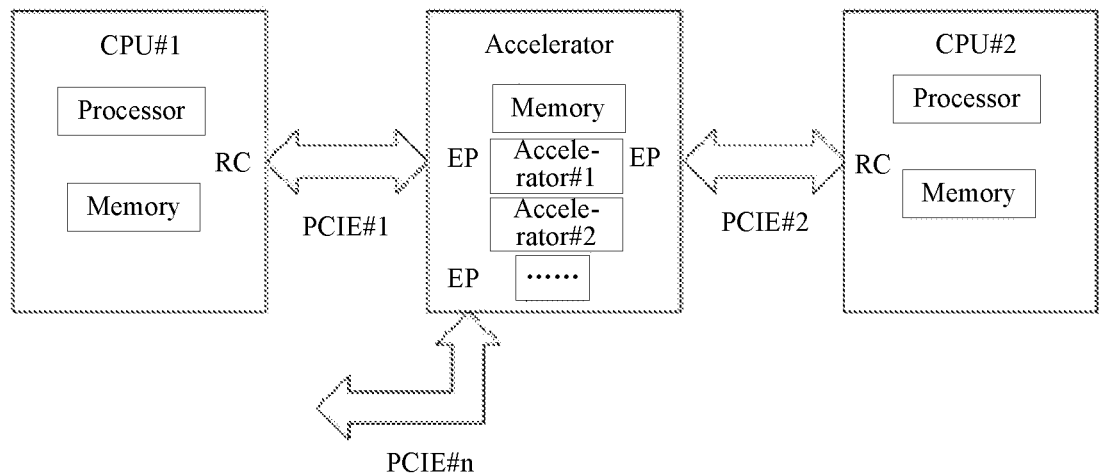
FIG. 6 is a schematic diagram of connection between processors and an accelerator according to an exemplary embodiment of the present disclosure.

Multiple RCs are connected to the EPs via the PCIE buses to form a star-type topology with the accelerator as the center and processor as the radiation endpoint. The number of processor nodes may be greater than or equal to 2. FIG. 6 is a schematic diagram of connection between processors and an accelerator according to an exemplary embodiment of the present disclosure.

After the system is powered on, the RC and the EP are initialized respectively. After starting, the processor scans a PCIE device and assigns an address of an access window of a PCIE domain to the EP in a memory domain.

The process that the processor accesses the domain space of the accelerator is that: the accelerator is set as the EP of the PCIE bus, the processor initiates a read and/or write access to an accelerator space, and the read and/or write access arrives at the accelerator after being converted into an access to the PCIE bus domain through the RC, so as to configure and read and/or write the data of the accelerator.

The process that the accelerator accesses an address domain space of the processor is that: an access to the PCIE bus domain initiated by the accelerator may also be converted to the processor domain through the RC to read and/or write the domain space of the processor. The conversion process is reverse to that of the process that the processor accesses the accelerator domain.

Figure 7:
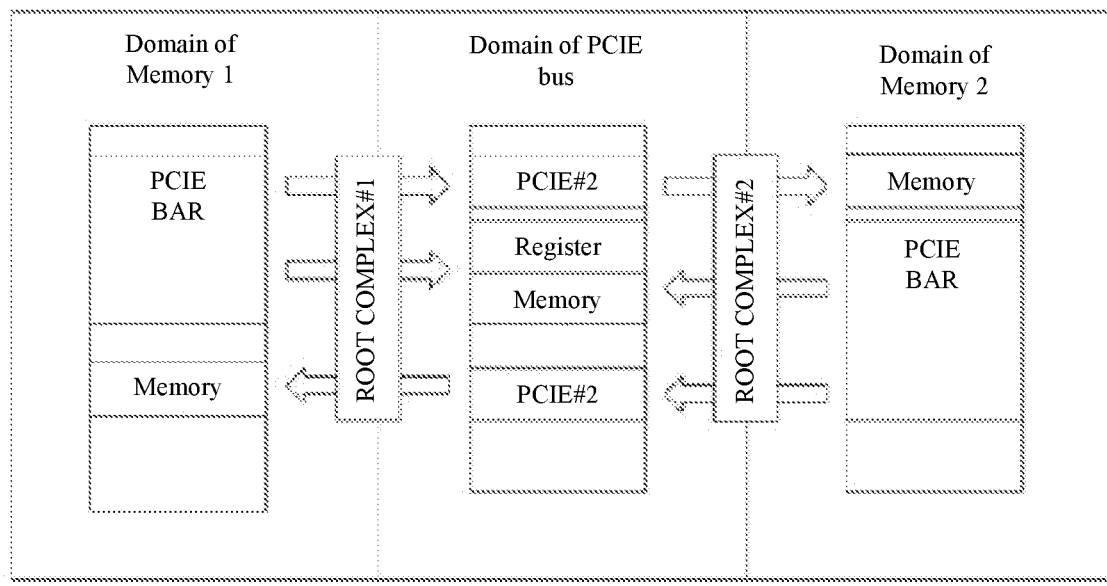
FIG. 7 is a schematic diagram of cross PCIE data access of processors according to an exemplary embodiment of the present disclosure.

The operation that the processors access each other across PCIE is that: the access initiated by processor #1 is first converted by RC #1 into an access to PCIE #1 domain, if the converted address falls into the space of PCIE #2 domain, RC #2 then converts the access to PCIE #1 domain into an access to memory domain of processor #2, so that the processor #1 reads and writes the space of the processor #2. The related conversion manner in the process that the processor #2 accesses the space of the processor #1 is similar to that in the process that the processor #1 accesses the space of the processor #2, but in reverse. FIG. 7 is a schematic diagram of cross PCIE data access of processors.

Through the exemplary embodiment, a scheme of star-type PCIE bus structure is provided, which achieves the effect of reducing hardware cost and reducing an access delay.

Figure 8:
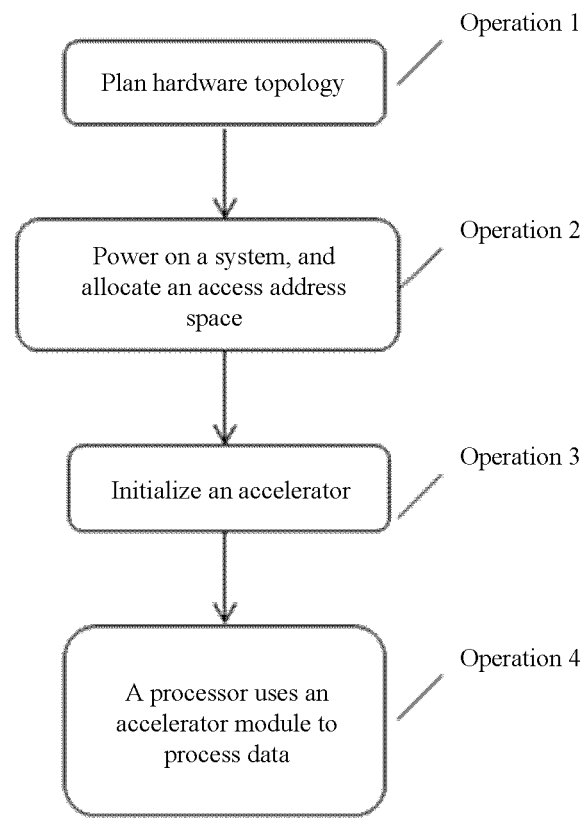
FIG. 8 is a flowchart of data processing based on a star-type PCIE bus structure according to an exemplary embodiment of the present disclosure.

FIG. 8 shows a flowchart of data processing based on the star-type PCIE bus structure according to an exemplary embodiment of the present disclosure. The implementation of the technical solution is further described in detail in combination with FIG. 8.

At operation 1, a star-type topological connection structure of the processor and the accelerator is planned.

At operation 2, the system is powered on, each module is started and initialized, and the processor scans PCIE peripherals and allocates an access address space.

At operation 3, the processor initializes the accelerator.

At operation 4, each processor sends data to the accelerator module, the accelerator returns a result to notify a target processor after processing the data, and each processor obtains the final result by consuming the data produced by the accelerator.

Figure 9:
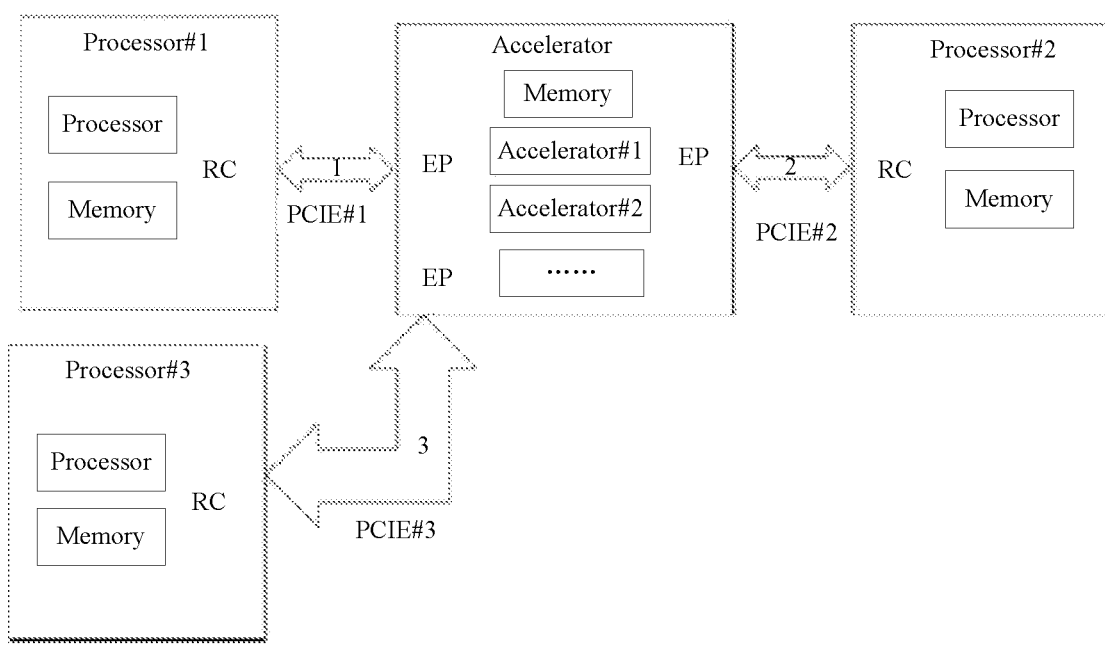
FIG. 9 is a schematic diagram of a data flow based on three processors and three star-type PCIE structures according to an exemplary embodiment of the present disclosure.

For example, the processing of data flow is illustrated based on the exemplary implementation under three processors and three star-type PCIE structures. The number of processors is only used here as an example to illustrate the data flow, and the specific number of processors can be determined according to the actual application scenarios. FIG. 9 is a schematic diagram of a data flow based on three processors and three star-type PCIE structures according to an exemplary embodiment of the present disclosure.

Processor #1 obtains basic data and sends the basic data to accelerator #1 through PCIE #1 for calculation, and the accelerator sends the processed data into the memory space of the accelerator and informs processors #2 and #3. After receiving messages, the processors #2 and #3 take the data through PCIE #2 and PCIE #3 for the next stage of analysis and processing; finally, the processor #2 returns the result to the processor #1 through PCIE #2 and PCIE #1, and the processor #3 returns the result to the processor #1 through PCIE #3 and PCIE #1. The structure is the exemplary implementation of data production and consumption under a complete star-type PCIE structure.

Through the above description of implementation modes, those having ordinary skill in the art may clearly know that the method according to the above embodiments may be implemented by means of software plus a necessary common hardware platform, certainly by means of hardware; but in many cases, the former is the better implementation. Based on this understanding, the technical solution of the present disclosure substantially or the part making a contribution to the prior art can be embodied in the form of software product; the computer software product is stored in a storage medium (for example, a Read-Only Memory (ROM)/Random Access Memory (RAM), a magnetic disk, and a compact disc) and includes a number of instructions to make a terminal device (which can be a cell phone, a personal computer, a server or a network device, etc.) perform all or part of the method in each embodiment of the present disclosure.

Some embodiments of the present disclosure provide a storage medium. The storage medium stores a computer program. When configured to run, the computer program performs operations in any of the above method embodiments.

In some exemplary implementations of the embodiments, the storage medium may be configured to store a computer program for executing the following operations.

At S1, an accelerator establishes a connection with M processors. The accelerator includes at least M endpoints, and each processor includes one root complex. One endpoint and one root complex are connected by means of one PCIE bus, M is a positive integer greater than 1 so that the M endpoints of the accelerator are connected to at least M processors by means of different PCIE buses, and the M processors include the first processor.

At S2, the accelerator receives the access address of the domain of the first PCIE bus. The access address of the domain of the first PCIE bus is converted, by the first processor, from the request for the read and/or write access initiated by the first processor, so that the accelerator accesses the data of the first processor.

In some exemplary implementations of the embodiments, the storage media include, but not limited to, a USB flash disk, a Read-Only Memory (ROM), a Random Access Memory (RAM), a mobile hard disk, a magnetic disk, a compact disc, and other media capable of storing the computer program.

An embodiment of the present disclosure also provides an electronic device, which includes a memory and a processor. The memory stores a computer program. The processor is configured to run the computer program to execute the operations in any above method embodiment.

In some exemplary implementations, the electronic device may also include a transmission device and an input/output device. The transmission device is connected with the processor, and the input/output device is connected with the processor.

In some exemplary implementations of the embodiments, the processor may be configured to execute the following operations through the computer program.

At S1, an accelerator establishes a connection with M processors. The accelerator includes at least M endpoints, and each processor includes one root complex. One endpoint and one root complex are connected by means of one PCIE bus, M is a positive integer greater than 1 so that the M endpoints of the accelerator are connected to at least M processors by means of different PCIE buses, and the M processors include the first processor.

At S2, the accelerator receives an access address of a domain of a first PCIE bus. The access address of the domain of the first PCIE bus is converted, by the first processor, from a read and/or write access request initiated by the first processor, so that the accelerator accesses the data of the first processor.

In some exemplary implementations, the specific examples in the present embodiment may refer to the examples described in the above embodiments and alternative embodiments.

It is apparent that those having ordinary skill in the art should appreciate that the above modules and operations of the present disclosure may be implemented by a general-purpose computing device, and they may be centralized in a single computing device or distributed on a network composed of multiple computing devices; in some exemplary implementations, they may be implemented by a program code which is capable of being executed by the computing device, so that they may be stored in a storage device and executed by the computing device; and in some situations, the presented or described operations may be executed in an order different from that described here; or they are made into integrated circuit modules, respectively; or multiple modules and operations of them are made into a single integrated circuit module to realize. Therefore, the present disclosure is not limited to any particular combination of hardware and software.

The above is only the exemplary embodiments of the present disclosure and not intended to limit the present disclosure; for those having ordinary skill in the art, the present disclosure may have various modifications and changes. Any modifications, equivalent replacements, improvements and the like within the principle of the present disclosure should fall within the protection scope of the claims of the present disclosure.

What is claimed is:

1. A multi-chip interconnection system based on Peripheral Component Interconnect Express (PCIE) buses, comprising:
    N accelerators, M processors, and M PCIE buses connecting the M processors with the N accelerators, N and M being positive integers, and M being greater than N; wherein each accelerator of the N accelerators comprises at least two endpoints, and each processor of the M processors comprises one root complex, wherein the at least two endpoints comprised in the each accelerator are connected with at least two root complexes of at least two processors in a one-to-one correspondence respectively by means of at least two PCIE buses among the M PCIE buses, so that the at least two endpoints comprised in the each accelerator are connected to the at least two processors by means of different PCIE buses;
    wherein the M processors comprise a first processor, wherein the root complex comprised in the first processor is connected to an endpoint comprised in one accelerator of the N accelerators by means of a first PCIE bus; the first processor is configured to convert a read and/or write access request into an access address of a domain of the first PCIE bus; in a case where the converted access address of the domain of the first PCIE bus falls into a domain space of a second processor, convert the access address of the domain of the first PCIE bus into an access address of a domain space of the second processor, so that the first processor accesses data of the second processor.

2. The multi-chip interconnection system based on PCIE buses according to claim 1, wherein
    the processor is further configured to assign an access address of a domain of the PCIE bus to the endpoint of the accelerator after the multi-chip interconnection system is powered on.

3. A method for data collaboration processing, comprising:
    initiating, by a first processor, a read and/or write access request to an accelerator, wherein a root complex comprised in the first processor is connected to an endpoint comprised in the accelerator by means of a first Peripheral Component Interconnect Express (PCIE) bus, the accelerator comprises at least two endpoints which are connected to at least two root complexes of at least two processors in a one-to-one correspondence respectively by means of different PCIE buses, and the at least two processors comprise the first processor;
    converting, by the first processor, the read and/or write access request into an access address of a domain of the first PCIE bus, and then sending, by the first processor, the access address of the domain of the first PCIE bus to the accelerator, thereby accessing, by the first processor, data of the accelerator; and
    converting, by the first processor, the read and/or write access request into the access address of the domain of the first PCIE bus; in a case where the converted access address of the domain of the first PCIE bus falls into a domain space of a second processor, converting the access address of the domain of the first PCIE bus into an access address of the domain space of the second processor, thereby accessing, by the first processor, data of the second processor.

4. The method for data collaboration processing according to claim 3, wherein accessing, by the first processor, the data of the second processor comprises:
    receiving, by the accelerator, first data sent by the first processor, and processing, by the accelerator, the first data to obtain second data;
    notifying, by the accelerator, a result of processing the first data to one or more second processors;
    receiving, by the accelerator, a second data request initiated by a respective one of the one or more second processors; and sending, by the accelerator in responsive to the second data request, the second data to the respective one of the one or more second processors.

5. The method for data collaboration processing according to claim 4, wherein sending, by the accelerator in responsive to the second data request, the second data to the respective one of the one or more second processors comprises:
receiving, by the accelerator by means of the first PCIE bus, the first data sent by the first processor;
processing, by the accelerator, the first data to obtain the second data, and saving, by the accelerator, the second data;
notifying, by the accelerator, the respective one of the one or more second processors of a situation that the second data is obtained; and
sending, by the accelerator, the second data to the respective one of the one or more second processors through a second PCIE bus.

6. A method for data collaboration processing, comprising:
establishing, by an accelerator, a connection with M processors, wherein the accelerator comprises at least M endpoints, and each processor comprises one root complex; M endpoints among the at least M endpoints comprised in the accelerator are connected with M root complexes of the M processors in a one-to-one correspondence respectively by means of M Peripheral Component Interconnect Express (PCIE) buses; M is a positive integer greater than 1 so that the M endpoints of the accelerator are connected to the M processors by means of different PCIE buses; and the M processors comprise a first processor;
receiving, by the accelerator, an access address of a domain of a first PCIE bus, wherein the access address of the domain of the first PCIE bus is converted, by the first processor, from a read and/or write access request initiated by the first processor, thereby accessing, by the accelerator, data of the first processor; and
receiving, by the accelerator, an access address of a domain space of a second processor, wherein the access address of the domain space of the second processor is converted from the access address of the domain of the first PCIE bus after the first processor converts the read and/or write access request into the access address of the domain of the first PCIE bus and in a case where the converted access address of the domain of the first PCIE bus falls into the domain space of the second processor, thereby accessing, by the first processor, data of the second processor.

7. The method for data collaboration processing according to claim 6, wherein before the accelerator receives the read and/or write access request initiated by the first processor, the method for data collaboration processing further comprises:
sending, by the accelerator, the access address of the domain of the first PCIE bus; and
converting the access address of the domain of the first PCIE bus into an access address of a domain space of the first processor, thereby accessing, by the accelerator, the first processor.

8. A non-transitory computer-readable storage medium, storing a computer program, which is configured to execute, when running, the method for data collaboration processing according to claim 3.

9. An electronic device, comprising a memory and a processor, wherein the memory stores a computer program, and the processor is configured to run the computer program to execute the method for data collaboration processing according to claim 3.

10. The multi-chip interconnection system based on PCIE buses according to claim 1, wherein
the first processor is further configured to initiate the read and/or write access request to the accelerator, convert the read and/or write access request into the access address of the domain of the first PCIE bus, and then send the access address of the domain of the first PCIE bus to the accelerator, so that the first processor accesses data of the accelerator.

11. The multi-chip interconnection system based on PCIE buses according to claim 1, wherein the first processor is configured to access the data of the second processor in a following manner:
the accelerator is configured to receive first data sent by the first processor, and process the first data to obtain second data;
the accelerator is configured to notify a result of processing the first data to one or more second processors;
the accelerator is configured to receive a second data request initiated by a respective one of the one or more second processors; and
the accelerator is configured to send, in responsive to the second data request, the second data to the respective one of the one or more second processors.

12. The multi-chip interconnection system based on PCIE buses according to claim 11, wherein the accelerator is configured to send, in responsive to the second data request, the second data to the respective one of the one or more second processors in the following manner:
the accelerator is configured to receive, by means of the first PCIE bus, the first data sent by the first processor;
the accelerator is configured to process the first data to obtain the second data and save the second data;
the accelerator is configured to notify the respective one of the one or more second processors of a situation that the second data is obtained; and
the accelerator is configured to send the second data to the respective one of the one or more second processors through a second PCIE bus.

13. A non-transitory computer-readable storage medium, storing a computer program, which is configured to execute, when running, the method for data collaboration processing according to claim 6.

14. An electronic device, comprising a memory and a processor, wherein the memory stores a computer program, and the processor is configured to run the computer program to execute the method for data collaboration processing according to claim 4.

15. An electronic device, comprising a memory and a processor, wherein the memory stores a computer program, and the processor is configured to run the computer program to execute the method for data collaboration processing according to claim 5.

16. An electronic device, comprising a memory and a processor, wherein the memory stores a computer program, and the processor is configured to run the computer program to execute the method for data collaboration processing according to claim 6.

17. An electronic device, comprising a memory and a processor, wherein the memory stores a computer program, and the processor is configured to run the computer program to execute the method for data collaboration processing according to claim 7.

* * * * *